June 21, 1960   J. MÜLLER   2,941,815
EQUALIZATION SPRING SUSPENSION MEANS FOR VEHICLES
Filed June 13, 1956
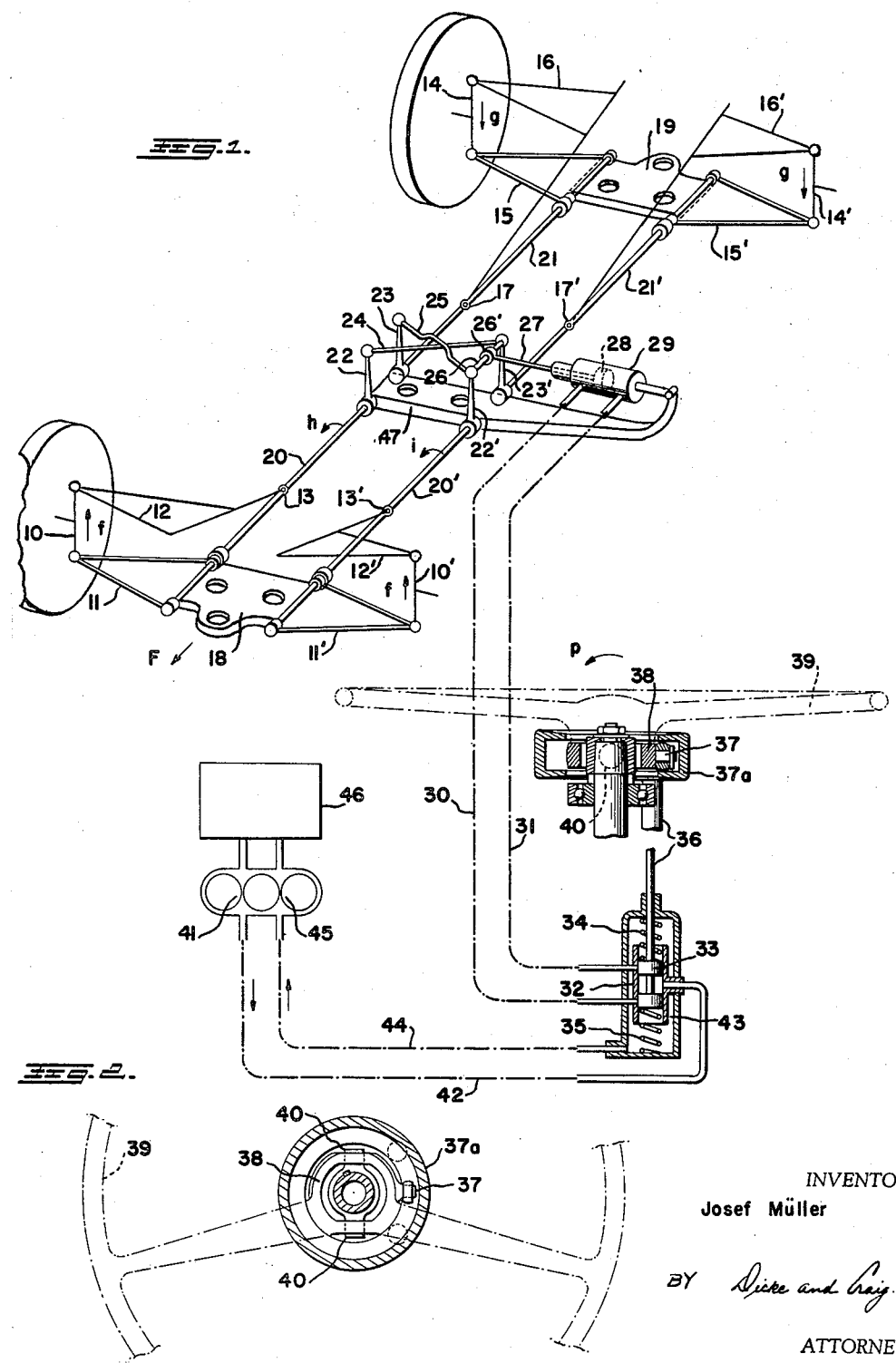
INVENTOR
Josef Müller
BY Dike and Craig
ATTORNEYS

United States Patent Office 2,941,815
Patented June 21, 1960

2,941,815
EQUALIZATION SPRING SUSPENSION MEANS FOR VEHICLES

Josef Müller, Stuttgart, Germany, assignor to Daimler-Benz Aktiengesellschaft, Stuttgart-Unterturkheim, Germany Filed June 13, 1956, Ser. No. 591,194
Claims priority, application Germany June 24, 1955
24 Claims. (Cl. 280—112)

This invention relates to spring suspension means for vehicles and has for an object to provide improved spring suspension means especially for power vehicles in which the spring means for the wheels is so supported relative to the spring means of other wheels that the spring movement of one wheel is transmitted to at least one other wheel.

Another object is to provide such a construction in which the spring movement of one wheel is transmitted to the spring means of all the other wheels.

Another object is to provide such spring means so constructed and arranged that the spring means for wheels diagonally opposed to each other are so connected that the spring movements of either one of such pair of wheels affects the other in the opposite direction.

Another object is to provide such spring means so constructed and arranged that the spring means for wheels which lie transversely opposed to each other are so connected that the spring movements of either one of such pair of wheels affects the other in the same direction.

Another object of the invention is to provide such spring suspension means for vehicles having means which may come into play while rounding curves and so affecting the mutually reacting spring system that the spring means for the wheels on the outside of the curve are strengthened and those of the wheels toward the inside of the curve are weakened.

A vehicle provided with a spring system in accordance with the present invention has the characteristics of an especially effective springing against road inequalities as well as good springing for cornering.

In one simple and effective embodiment of the invention, the spring means for diagonally opposed wheels are connected through a linkage whereby the arrangement for stabilizing is connected with an equalizing beam connecting the two said linkages together.

The point of attachment of the arrangement for curve stabilization to the spring system lies preferably in the center of gravity of the sprung vehicle part or near thereto. The wheel suspension as well as the opposed spring abutments may form together with the stabilizer arrangement a common aggregate supported elastically on the vehicle superstructure so that blows and shocks which rise from the road surface are insulated from the upper part of the vehicle.

The system according to the invention may be applied advantageously with longitudinally extending torsion bar springs from the standpoint of space and effectiveness and the curve stabilization arrangement is preferably operated hydraulically and is connected to linkages which connect with the frame ends of the springs of both sets of wheels.

The invention is of special importance and value in wheel suspension in which the wheels are supported by means of two superposed links or through other supporting elements using a quadrilateral linkage or which are controlled for substantially parallel movement, since in this case the wheels are given a tilt toward the inside of the curve through the stabilization arrangement.

The "riding feel" especially during rapid cornering is noticeably improved due to reduced roll and on account of the inward tilt. The individual and variable springing as well as the total springing may be softer than otherwise since no attention need be given to roll on curves. The frame twisting and the rolling of the vehicle is reduced, and therefore frames and wheel supports may be constructed more lightly.

The control for the mechanism for opposing outward roll on curves may be effected from the steering mechanism although preferably independently of the steering movement thereof. For example, the control of said arrangement may be had by making the steering wheel swingable about an axis transverse to the steering column. Hereby, the control of said arrangement is adjusted in accordance with the natural feel of the driver while cornering in that at the same time the advantage is attained that the vehicle superstructure may be given a tilt opposing the centrifugal force before entering the curve and thereby the uncomfortable effect of centrifugal force can be met at the very beginning of the curve.

Other objects will appear from the following description of an illustrative embodiment of the invention taken together with the attached drawings wherein:

Fig. 1 is a schematic form of a wheel suspension in accordance with the invention including a stabilizing mechanism controlled from the steering wheel and Fig. 2 is a plan view of the steering wheel according to Fig. 1.

The wheel carriers 10, 10' of the front wheels (of which one is fragmentarily shown in Figure 1 of the drawing, the other being similarly disposed) are supported through two superposed guide links 11, 11' and 12, 12' connected to the vehicle frame (also not shown in detail). The axes of rotation of the upper links 12, 12' are inclined downward and rearward so that the axis of rotation of the upper and lower links intersect at the points 13, 13' whereby the pitching of the vehicle due to acceleration and braking permitted by the differential springing is opposed.

In a similar manner, the wheel carriers 14, 14' of the rear wheels (of which one is shown in Figure 1 of the drawing, the other being similarly disposed) are supported through two superposed supporting links 15, 15' and 16, 16' so arranged that the axis of rotation of the links intersect each other in points 17, 17'.

Instead of attaching the links directly to the frame or the body, they may be attached to special auxiliary frames 18, 19 which are connected elastically to the main frame or the vehicle superstructure and in effect constitute part of the superstructure.

The links 11, 11' or 15, 15' are sprung through torsion bar springs 20, 20' or 21, 21' which lie in the axis of rotation of the said links and are connected at one end with said links and at the other ends with levers 22, 22', 23, 23' which are connected in a crossed over manner through rods 24 or 25 in such a manner that the right front wheel is differentially connected with the diagonally opposed left rear wheel through the rod 24 and the left front wheel is connected similarly with the right rear wheel through the rod 25.

The levers 22' and 23' are shown connected with each other by means of an equalizing beam 26, fulcrumed at its center point 26'. This fulcrum point may be stationary or adjustable as by forming it on the piston rod 27 to which the piston 28 is attached. Said piston operates in a cylinder 29 of a servo arrangement attached for example to the vehicle superstructure. Preferably, however, the levers 22, 23, 22', 23', may, along with cylinder 29, be elastically connected to the vehicle structure for example through a common transverse support 47 or through an auxiliary frame or the like which on its part is elastically fastened to the vehicle superstructure as for example through rubber bumpers.

The two sides of the piston 28 are connected through tubes 30 and 31 with a control valve comprising the cylinder 32 and the control slide 33 which slide is for example, normally held in its central position through springs 34 and 35 and may be actuated through rod 36 which is pivotally connected to a stud 37 in the hub of the steering wheel 39. The latter is supported swingably about an axis determined by the studs 40 which, when the vehicle is running in a straight line, lie preferably in a vertical plane in the direction of travel.

Fluid from the pump 41 supplied through tube 42 is controlled by the control slide 33 of the control valve whereas the return flow is returned to a pump 45 through return conduit 44 and to the container 46. Instead of the duplex pump shown a single pump could, of course, be used.

The method of operation of the described arrangement is as follows: If, while the wheels are travelling in the direction F, one of the wheels is given a spring movement, for example the left front wheel is thrust upwardly in the direction of the arrow $f$, the lever 22' is moved in counterclockwise direction and moves lever 23 in the same direction through rod 25, so that the right rear wheel and its wheel carrier 15 is pressed downwardly in the direction of arrow $g$ so that the control links 16 and 15 tend to be shifted in a direction opposed to the movement of the links 11' and 12'. If the servo means 28, 29 is not changed, the equalizing beam 26 turns about its middle point 26' so that the lever 23' and through rod 24 also the levers 22, is moved clockwise. The right front wheel with its wheel carrier 10 and the left rear wheel with its wheel carrier 14' are therefore, through stress applied to the torsion bar springs 20 or 21' impelled in the direction of stroke $f$ or $g$ and influence the spring movements of the directly opposed wheels in the same direction.

When the vehicle enters a curve, for example a left curve, the steering wheel 39 may be tilted leftward about the axis of the studs 40 (namely in the direction of the arrow $p$ in Fig. 1) whereby the joint 37 together with the valve piston 33 is drawn upward so that pressure fluid from the tube 42 is delivered to tube 31 and the piston 28 is moved leftward. This results in the movement of the two rods 24 and 25 causing the lever 22 and 23 as well as the levers 22' and 23' to be shifted counterclockwise. Thereby the springs 20 and 21 of the wheels to the outside of the curve (on the right side of the vehicle) are given a supplemental stress $h$ whereas at the same time the springs 20', 21' for the wheels on the inside of the curve are relaxed as shown at $i$. The reaction force working in the cylinder 29 will therefore cause the vehicle superstructure to lean inwardly of the curve in which the vehicle wheels take part in view of their parallel or almost parallel connection with the vehicle.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. In a road vehicle having a superstructure and four road wheels, suspension means for springing said wheels relative to the vehicle superstructure, means for supporting the suspension means of each road wheel in such a manner against the suspension means of the other road wheels that the movement of any road wheel reacts upon all the other road wheels, anti-roll curve stabilization means acting upon said opposed suspension means in such a manner as at certain times to stiffen the spring means for the wheels at one side of the vehicle while relaxing the spring means for the wheels at the other side of the vehicle, and control means for said curve stabilization means, said means for supporting the suspension means comprising means for transmitting movements from the suspension means of any one wheel to the suspension means of the other three wheels, said means for transmitting movements comprising an equalizing device provided with a plurality of connection portions and further comprising means connecting the suspension means of one pair of said road wheels to a first one of said connection portions, means connecting the suspension means of the other pair of said road wheels to a second one of said connection portions, and means for connecting said anti-roll curve stabilization means to a third one of said connection portions, said last-named means for connecting being movable only in response to actuation of said control means.

2. In a road vehicle having a superstructure and four road wheels, suspension means for springing said wheels relative to the vehicle superstructure, connecting means interconnected by a longitudinally disposed beam for supporting the suspension means of each road wheel in such a manner against the suspension means of the other road wheels that the movement of any road wheel reacts upon all the other road wheels in such a manner that spring movement of any wheel affects its diagonally opposed wheel in the opposite direction, said connecting means comprising a rod which connects one wheel suspension means with its diagonally opposed wheel suspension means and a second rod which connects the suspension means for the other two diagonally opposed wheels, said first-mentioned rod and said second rod being interconnected by a beam disposed longitudinally of the vehicle.

3. In a road vehicle having a superstructure and four road wheels, suspension means for springing said wheels relative to the vehicle superstructure, connecting means for supporting the suspension means of each road wheel in such a manner against the suspension means of the other road wheels that the movement of any road wheel reacts upon all the other road wheels in such a manner that spring movement of any wheel affects its diagonally opposed wheel in the opposite direction, said connecting means comprising a link which connects one wheel suspension means with its diagonally opposed wheel suspension means and a second link which connects the suspension means for the other two diagonally opposed wheels together with an equalizing beam having a fulcrum intermediate its ends and having one end connected to said first link and having its other end connected to said second link.

4. In a road vehicle having a superstructure and four road wheels, suspension means for springing said wheels relative to the vehicle superstructure, connecting means for supporting the suspension means of each road wheel in such a manner against the suspension means of the other road wheels that the movement of any road wheel reacts upon all the other road wheels in such a manner that spring movement of any wheel affects its diagonally opposed wheel in the opposite direction, said connecting means comprising a link which connects one wheel suspension means with its diagonally opposed wheel suspension means and a second link which connects the suspension means for the other two diagonally opposed wheels together with an equalizing beam having a fulcrum intermediate its ends and having one end connected to said first link and having its other end connected to said second link together with anti-roll curve stabilization means connected to said fulcrum for adjusting said fulcrum in a direction transverse to said beam, whereby the spring means for the wheels at one side of the vehicle may be stiffened while the spring means for the wheels at the other side of the vehicle are relaxed.

5. The combination according to claim 4 in which said fulcrum is located near the center of gravity of the spring suspended part of said vehicle.

6. In a road vehicle having a superstructure and four road wheels, suspension means for springing said wheels relative to the vehicle superstructure comprising wheel guiding means for each wheel, a torsion bar for each wheel extending longitudinally of the vehicle, each having one end connected to said wheel guiding means and its other end having a lever attached thereto, said four levers being located near the center of the vehicle, a link connecting the lever of one front wheel with the lever of the diagonally opposed rear wheel, a separate link connecting the lever of the other front wheel with the lever of the diagonally opposed other rear wheel, and equalizing means connecting said levers.

7. In a road vehicle having a superstructure and four road wheels, suspension means for springing said wheels relative to the vehicle superstructure comprising wheel guiding means for each wheel, a torsion bar for each wheel extending longitudinally of the vehicle, each having one end connected to said wheel guiding means and its other end having a lever attached thereto, said four levers being located near the center of the vehicle, a link connecting the lever of one front wheel with the lever of the diagonally opposed rear wheel and a link connecting the lever of the other front wheel with the lever of the diagonally opposed other rear wheel, together with an equalizing beam having its ends connected to the levers of the wheels on one side of the vehicle and having a fulcrum intermediate its ends.

8. In a road vehicle having a superstructure and four road wheels, suspension means for springing said wheels relative to the vehicle superstructure comprising wheel guiding means for each wheel, a torsion bar for each wheel extending longitudinally of the vehicle, each having one end connected to said wheel guiding means and its other end having a lever attached thereto, said four levers being located near the center of the vehicle, a link connecting the lever of one front wheel with the lever of the diagonally opposed rear wheel and a link connecting the lever of the other front wheel with the lever of the diagonally opposed other rear wheel, together with an equalizing beam having its ends connected to the levers of the wheels on one side of the vehicle and having a fulcrum intermediate its ends and together with anti-roll curve stabilization means connected to said fulcrum for adjusting said fulcrum in a direction transverse to said beam, whereby the torsion bars for the wheels at one side of the vehicle may be stiffened while the torsion bars for the wheels at the other side of the vehicle are relaxed.

9. The combination according to claim 1, wherein said vehicle is provided with steering mechanism having a tiltable element and said control means for said curve stabilization means is operated by said tiltable element.

10. The combination according to claim 1, wherein said control means for said curve stabilization means includes hydraulic means and means including a manually tiltable member for controlling said hydraulic means.

11. The combination according to claim 7 in which the lever carrying ends of the torsion bars and the fulcrum are mounted on a common supporting frame member.

12. The combination according to claim 8 in which the lever carrying ends of the torsion bars, the fulcrum and the fulcrum adjusting curve stabilization means are mounted on a common supporting frame member.

13. In a road vehicle having a superstructure and four road wheels, suspension means for springing said wheels relative to said vehicle superstructure, connecting means for supporting each road wheel suspension means against the other road wheel suspension means in such a manner that the movement of any one road wheel reacts upon all the other road wheels and the spring movement of any one road wheel affects the diagonally opposed wheel thereof in an opposite direction, said connecting means connecting each wheel suspension means with the diagonally opposed wheel suspension means thereof in a crosswise manner, and said connecting means comprising an equalizing mechanism interconnecting the connecting means of two diagonally opposed wheels to the connecting means of the other two diagonally opposed wheels, said equalizing mechanism having an anti-roll curve stabilization device connected thereto for affecting the suspension means of the two wheels on one side of said vehicle in the same directional sense as the two wheels on the other side thereof.

14. The combination according to claim 13, wherein said vehicle is provided with a steering mechanism for at least two of said vehicle wheels and with control means for said curve stabilization means operated by an element of said steering mechanism.

15. In a road vehicle having a superstructure and four road wheels, suspension means for springing said wheels relative to said vehicle superstructure, means for supporting the suspension means of each road wheel against the suspension means of the other road wheels so that the movement of any road wheel reacts upon the other road wheels and the spring movement of any wheel affects its directly opposed wheel in the same direction, anti-roll curve stabilization means acting upon said opposed suspension means for stiffening the spring means for the wheels at one side of said vehicle at certain times while relaxing the spring means for the wheels at the other side of said vehicle, an hydraulic mechanism for actuating said curve stabilization means, said vehicle being provided with a steering mechanism having a control valve, a steering wheel forming an element of said steering mechanism, said steering wheel being mounted upon a steering shaft for rotation therewith and for limited oscillation about an axis in a plane generally longitudinal of said vehicle, and means so connecting said steering wheel with said control valve that oscillation of said steering wheel about said axis will actuate said control valve.

16. In a road vehicle having a superstructure and four road wheels, suspension means for springing said road wheels relative to said vehicle superstructure, means for supporting the suspension means of each road wheel against the suspension means of the other road wheels so that the movement of any road wheel reacts upon all the other road wheels and the spring movement of any wheel affects its diagonally opposed wheel in the opposite direction while affecting its directly opposed wheel in the same direction, said road wheels each being carried by a wheel carrier pivoted to the ends of superposed and relatively inclined upper and lower supporting links pivoted relative to said vehicle superstructure, and the axes of oscillation of said upper links sloping downwardly toward the center of said vehicle.

17. In a road vehicle, the combination according to claim 1, wherein said third one of said connection portions is disposed intermediate said first one and said second one of said connection portions.

18. In a road vehicle having a superstructure and four road wheels, suspension means for springing said wheels relative to said vehicle superstructure, means including crossed rods interconnected by an equalizing beam disposed in the lengthwise direction of the vehicle, said means being provided for supporting the suspension means of each road wheel in such a manner against the suspension means of the other road wheels that the movement of any road wheel acts upon all the other road wheels, anti-roll curve stabilization means acting upon said opposed suspension means in such a manner as at certain times to stiffen the spring means for the wheels at one side of the vehicle while relaxing the spring means at the other side of the vehicle.

19. In a road vehicle having a superstructure and four road wheels, suspension means for each of said wheels, each said suspension means comprising spring means having ends, one end of each said spring means being adjacent one of said wheels, means cross-connecting the other ends of those pairs of said spring means comprised in the said suspension means of diagonally opposed wheels, equalizing means interconnecting said cross-connecting means, means for movably controlling said equalizing means, movement of said equalizing means causing said spring means comprised in the said suspension means of the vehicle on one side of the vehicle to be stiffened and causing said spring means comprised in the suspension means of the wheels on the opposite side of the vehicle to be relaxed.

20. In a road vehicle, the combination according to claim 19, wherein said cross-connecting means comprise diagonally crossed rods, and wherein said equalizing means comprises an equalizing link extending lengthwise of the vehicle and being connected to an end of each of said crossed rods.

21. In a road vehicle having a superstructure, and four road wheels, suspension means for springing said wheels relative to the vehicle superstructure, means for supporting the suspension means of each road wheel against the suspension means of the other road wheels that the movement of any road wheel reacts upon all the other road wheels, anti-roll curve stabilization means and control means for said curve stabilization means, said means for supporting the suspension means comprising means for transmitting movements from the suspension means of any one wheel to the suspension means of the other three wheels, said means for transmitting movements comprising an equalizing device provided with a plurality of connection portions, and further comprising means connecting the suspension means of one pair of said road wheels to a first one of said connection portions, means connecting the suspension means of the other pair of said road wheels to a second one of said connection portions, and means for connecting said anti-roll curve stabilization means to a third one of said connection portions, said last-named means for connecting being movable only in response to actuation of said control means, said control means for said stabilization means including a manually tiltable member.

22. In a road vehicle, the combination of claim 21, wherein said manually tiltable member is the steering wheel of the vehicle.

23. In a road vehicle having a superstructure and four road wheels, interconnected suspension means for springing said wheels relative to the vehicle superstructure, means including a longitudinally disposed equalizing beam for supporting the suspension means of each road wheel in such a manner against the suspension means of the other road wheels that the movement of any road wheel reacts upon the other road wheels in such a manner that spring movement of any wheel affects its directly opposed wheel in the same direction, anti-roll curve stabilization means acting upon said opposed suspension means in such a manner as at certain times to stiffen the spring means for the wheels at one side of the vehicle while relaxing the spring means for the wheels at the other side of the vehicle, said vehicle being provided with steering mechanism and said curve stabilization means being actuated by hydraulic mechanism, a control valve for said hydraulic mechanism and means operated by an element of said steering mechanism for operating said control valve.

24. In a road vehicle having a superstructure and four road wheels, interconnected suspension means for springing said wheels relative to the vehicle superstructure, means including an equalizing beam for supporting the suspension means of each road wheel in such a manner against the suspension means of the other road wheels that the movement of any road wheel reacts upon all the other road wheels in such a manner that spring movement of any wheel affects its diagonally opposed wheel in the opposite direction while affecting its directly opposed wheel in the same direction, said road wheels being each carried by a wheel carrier pivoted to the ends of two superposed supporting links pivoted relative to the vehicle superstructure, the axis of oscillation of the upper links sloping downwardly toward the center of the vehicle.

References Cited in the file of this patent
UNITED STATES PATENTS

| | | |
|---|---|---|
| 1,785,118 | Fry | Dec. 16, 1930 |
| 2,083,381 | Hutchinson | June 8, 1937 |
| 2,191,211 | Krotz | Feb. 20, 1940 |
| 2,260,102 | Freret | Oct. 21, 1941 |
| 2,621,057 | Oster | Dec. 9, 1952 |
| 2,735,691 | Carlson | Feb. 21, 1956 |
| 2,739,823 | Kolbe | Mar. 27, 1956 |